(12) United States Patent
Hayashida et al.

(10) Patent No.: US 10,946,800 B2
(45) Date of Patent: Mar. 16, 2021

(54) IMAGE DISPLAY APPARATUS FOR DISPLAYING SURROUNDING IMAGE OF VEHICLE

(71) Applicant: HONDA MOTOR CO., LTD., Tokyo (JP)

(72) Inventors: Yoshimasa Hayashida, Wako (JP); Kei Oshida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/671,522

(22) Filed: Nov. 1, 2019

(65) Prior Publication Data

US 2020/0164800 A1 May 28, 2020

(30) Foreign Application Priority Data

Nov. 26, 2018 (JP) .............................. JP2018-220583

(51) Int. Cl.
*H04N 7/18* (2006.01)
*B60R 1/00* (2006.01)
(Continued)

(52) U.S. Cl.
CPC ........... *B60R 1/00* (2013.01); *H04N 5/23238* (2013.01); *H04N 5/2628* (2013.01); *H04N 5/272* (2013.01);
(Continued)

(58) Field of Classification Search
CPC ....................................................... B60R 1/00
(Continued)

(56) References Cited

U.S. PATENT DOCUMENTS 5,469,536 A * 11/1995 Blank .................. H04N 1/3873
345/594
5,566,251 A * 10/1996 Hanna .................... H04N 5/272
348/588

(Continued)

FOREIGN PATENT DOCUMENTS

JP  2010-039953 A  2/2010

OTHER PUBLICATIONS

Author Unknown; Concerning the Adoption of Uniform Technical Prescriptions for Wheeled Vehicles, Equipment and Parts which can be Fitted and/or be Used on Wheeled Vehicles and the Conditions for Reciprocal Recognition of Approvals Granted on the Basis of these Prescriptions; Aug. 19, 2013; pp. 1-66; Regulation 46, Revision 5, E/ECE/324/Rev.1/Add.45/Rev.5-E/ECE/TRANS/505/Rev.1/Add.45/Rev.5; United Nations; Geneva, Switzerland.

(Continued)

*Primary Examiner* — Leron Beck
(74) *Attorney, Agent, or Firm* — Thomas Horstemeyer, LLP

(57) ABSTRACT

An image display apparatus 10 is described having a left display 12L that displays an image of what is to the left side rear of the self-vehicle V and a right display unit 12R that displays an image of what is to the right side rear of the self-vehicle V. The image display apparatus 10 generates an indicator 47 to be superimposed on an image displayed on the left display unit 12L and/or an indicator 47 to be superimposed on an image displayed on the right display 12R. The indicators are generated in accordance with an operation of the turn signal switch 7 or in accordance with an operation of a predetermined operation unit 15 provided separately to the turn signal switch 7.

11 Claims, 9 Drawing Sheets

(51) Int. Cl.
*H04N 5/272* (2006.01)
*H04N 5/445* (2011.01)
*H04N 5/262* (2006.01)
*H04N 5/232* (2006.01)
*B60R 11/00* (2006.01)
*B60R 11/04* (2006.01)

(52) U.S. Cl.
CPC .......... *H04N 5/44504* (2013.01); *B60R 11/04* (2013.01); *B60R 2011/004* (2013.01); *B60R 2300/105* (2013.01); *B60R 2300/305* (2013.01); *B60R 2300/8046* (2013.01)

(58) Field of Classification Search
USPC .......................................................... 348/36
See application file for complete search history.

(56) References Cited

U.S. PATENT DOCUMENTS

| | | | | |
|---|---|---|---|---|
| 7,044,742 | B2* | 5/2006 | Sumiya | G08B 23/00 340/425.5 |
| 2003/0117728 | A1* | 6/2003 | Hutzel | H04N 7/181 359/838 |
| 2006/0290482 | A1* | 12/2006 | Matsumoto | G08G 1/167 340/436 |
| 2008/0186382 | A1* | 8/2008 | Tauchi | G01S 13/89 348/148 |
| 2008/0231703 | A1* | 9/2008 | Nagata | H04N 7/181 348/148 |
| 2009/0233572 | A1* | 9/2009 | Basir | H04M 11/04 455/404.1 |
| 2009/0244296 | A1* | 10/2009 | Petrescu | H04N 5/262 348/207.99 |
| 2010/0033348 | A1* | 2/2010 | Kawabata | B60R 1/00 340/932.2 |
| 2012/0054028 | A1* | 3/2012 | Tengler | G06Q 30/02 705/14.49 |
| 2012/0105635 | A1* | 5/2012 | Erhardt | G08B 13/19647 348/148 |
| 2012/0140073 | A1* | 6/2012 | Ohta | B60R 25/1012 348/148 |
| 2012/0200427 | A1* | 8/2012 | Kamata | B60Q 9/008 340/901 |
| 2014/0085469 | A1* | 3/2014 | Sakano | H04N 17/002 348/148 |
| 2014/0192181 | A1* | 7/2014 | Taylor | B60Q 9/00 348/118 |
| 2015/0029206 | A1* | 1/2015 | Bialota | G06T 11/00 345/589 |
| 2015/0319360 | A1* | 11/2015 | Sato | H04N 5/23206 348/207.11 |
| 2016/0042543 | A1* | 2/2016 | Hashimoto | H04N 5/23229 345/629 |

OTHER PUBLICATIONS

Author Unknown; Uniform provisions concerning the approval of devices for indirect vision and of motor vehicles with regard to the installation of these devices; Nov. 10-13, 2015; pp. 1-88, ECE/TRANS/WP.29/2015/84, 167th Session, Item 4.7.3 of the provisional agenda; United Nations Economic and Social Council, Economic Commissions or Europe, Inland Transport Committee, World Forum for Harmonization of Vehicle Regulations; Geneva, Switzerland.

* cited by examiner

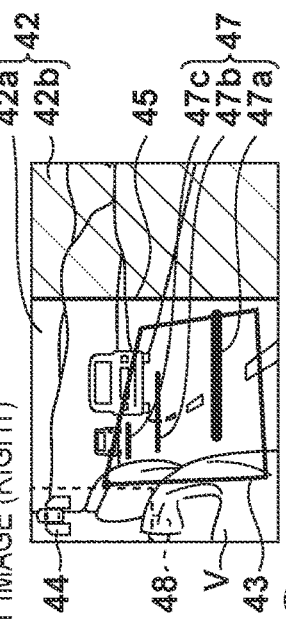
F I G. 6A  WIDE-ANGLE VIEW MODE
IMAGE CAPTURED BY CAMERA (RIGHT)
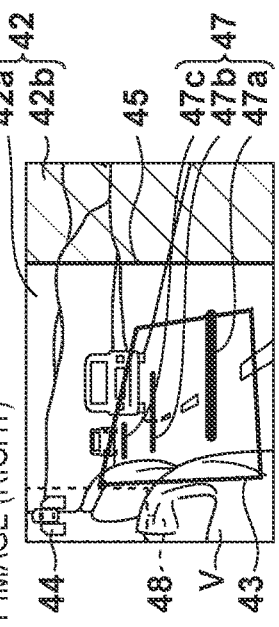
F I G. 6B  WIDE-ANGLE VIEW MODE
DISPLAY OUTPUT IMAGE (RIGHT)
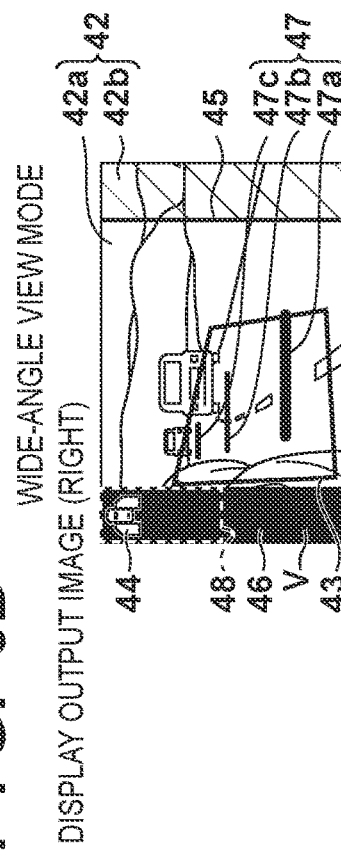
F I G. 6C  WIDE-ANGLE VIEW MODE
DISPLAY OUTPUT IMAGE (RIGHT)
F I G. 6D  WIDE-ANGLE VIEW MODE
DISPLAY OUTPUT IMAGE (RIGHT)
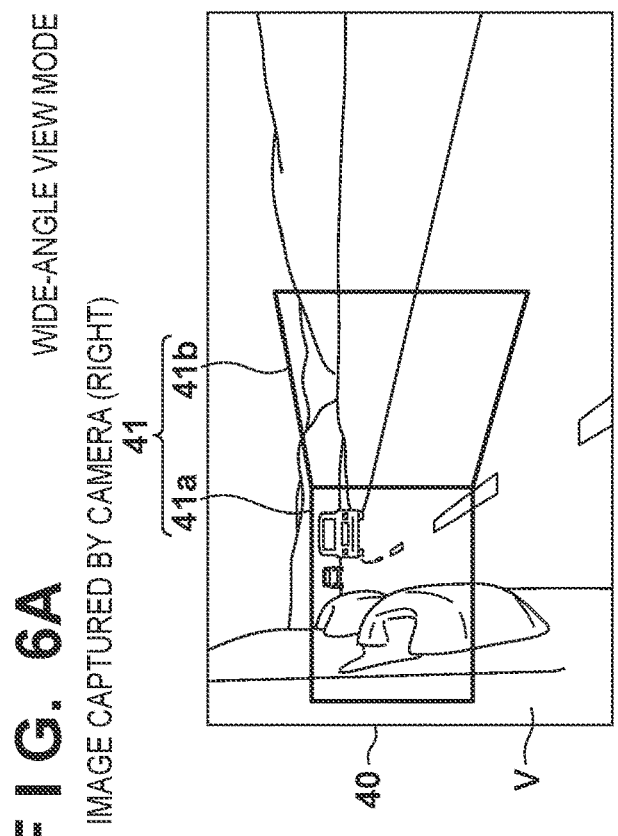
F I G. 6E  WIDE-ANGLE VIEW MODE
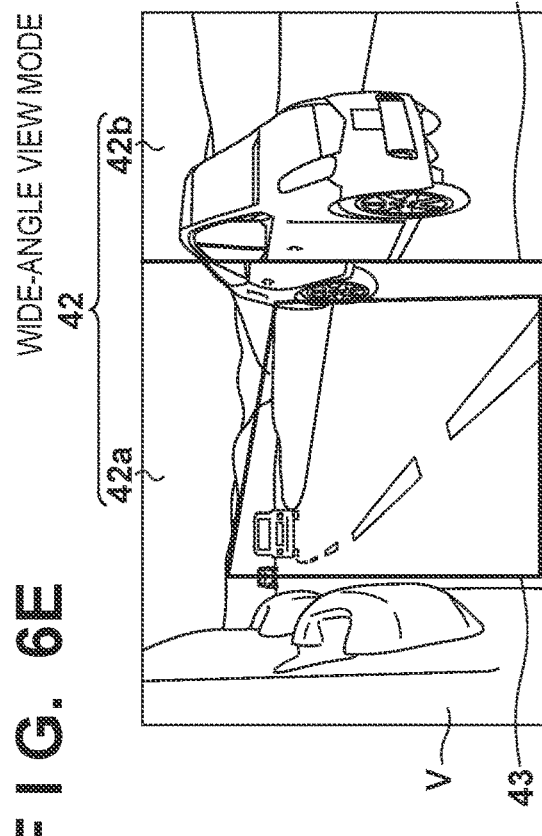

REVERSE VIEW MODE
DISPLAY OUTPUT IMAGE (RIGHT)

REVERSE VIEW MODE
IMAGE CAPTURED BY CAMERA (RIGHT)

IMAGE DISPLAY APPARATUS FOR DISPLAYING SURROUNDING IMAGE OF VEHICLE

CROSS-REFERENCE TO RELATED APPLICATION

This application claims priority to and the benefit of Japanese Patent Application No. 2018-220583 filed on Nov. 26, 2018, the entire disclosure of which is incorporated herein by reference.

BACKGROUND OF THE INVENTION

Field of the Invention

The present invention relates to an image display apparatus operable to display an image of surroundings of a vehicle.

Description of the Related Art

Conventional vehicles are equipped with rearview mirrors, door mirrors, and the like for checking the state of the surroundings of the vehicle. Using a rearview mirror or a door mirror, the driver can confirm the situation on a side or to the rear of the vehicle while looking at what is in front of the vehicle and driving.

However, conventional mirrors have problems such as a blind spot, air resistance, and an increase in vehicle width. It is possible to replace a conventional mirror with an electronic mirror that displays an image of surroundings of the vehicle using a display panel or the like, under the condition that safety standards established by the Ministry of Land, Infrastructure, Transport and Tourism are satisfied. Such an electronic mirror system is called a CMS (Camera Monitor System). By a CMS, as illustrated in FIG. 4, regions RO, which are blind spots of a conventional door mirror, can be seen.

Japanese Patent Laid-Open No. 2010-039953 discloses a driving assistance apparatus which displays an indicator for indicating a distance from the self-vehicle to the rear so as to be superimposed on an image obtained by capturing what is to the side rear of the self-vehicle.

In a CMS, since the visible view range can be made wider than in the conventional case, there is a possibility that the driver may misunderstand the distance to an object present in the surroundings of the self-vehicle (such as a vehicle traveling to the side rear of the self-vehicle) due to a misalignment with their sense of the distance to an object present in the surroundings of the self-vehicle.

SUMMARY OF THE INVENTION

The present invention has been made in consideration of the aforementioned problems, and realizes a system by which it is possible to easily know the distance to an object present in the surroundings of the self-vehicle.

In order to solve the aforementioned problems, a first aspect of the present invention provides an image display apparatus operable to display an image of surroundings of a self-vehicle, the apparatus comprising: an image capturing unit configured to capture what is to a side rear of the self-vehicle; a display unit configured to display an image captured by the image capturing unit; a generation unit configured to generate an indicator for indicating a distance from the self-vehicle to the rear; and a superimposition unit configured to superimpose the indicator onto an image to be displayed on the display unit, wherein the display unit comprises a first display unit that displays an image of what is to the left side rear of the self-vehicle and a second display unit that displays an image of what is to the right side rear of the self-vehicle, and the generation unit generates an indicator to be superimposed on an image displayed on the first display unit and/or an indicator to be superimposed on an image displayed on the second display unit, in accordance with an operation of a direction indication operation unit or an operation of a predetermined operation unit provided separately to the direction indication operation unit.

In order to solve the aforementioned problems, the second aspect of the present invention provides a method for controlling an image display apparatus operable to display an image of surroundings of a self-vehicle, the image display apparatus having an image capturing unit configured to capture what is to a side rear of the self-vehicle and a display unit configured to display an image captured by the image capturing unit, the display unit comprising a first display unit that displays an image of what is to the left side rear of the self-vehicle and a second display unit that displays an image of what is to the right side rear of the self-vehicle, wherein the method comprises: generating an indicator for indicating a distance from the self-vehicle to the rear; and superimposing the indicator onto an image to be displayed on the display unit, wherein in the generating an indicator to be superimposed on an image displayed on the first display unit and/or an indicator to be superimposed on an image displayed on the second display unit is generated, in accordance with an operation of a direction indication operation unit or an operation of a predetermined operation unit provided separately to the direction indication operation unit.

In order to solve the aforementioned problems, the third aspect of the present invention provides a non-transitory computer-readable storage medium storing a program for causing a computer to execute a method for controlling an image display apparatus operable to display an image of surroundings of a self-vehicle, the image display apparatus having an image capturing unit configured to capture what is to a side rear of the self-vehicle and a display unit configured to display an image captured by the image capturing unit, the display unit comprising a first display unit that displays an image of what is to the left side rear of the self-vehicle and a second display unit that displays an image of what is to the right side rear of the self-vehicle, wherein the method comprises: generating an indicator for indicating a distance from the self-vehicle to the rear; and superimposing the indicator onto an image to be displayed on the display unit, wherein in the generating an indicator to be superimposed on an image displayed on the first display unit and/or an indicator to be superimposed on an image displayed on the second display unit is generated, in accordance with an operation of a direction indication operation unit or an operation of a predetermined operation unit provided separately to the direction indication operation unit.

According to the present invention, it is possible to easily know the distance to an object present in the surroundings of the self-vehicle.

Other features and advantages besides those discussed above shall be apparent to those skilled in the art from the description of an embodiment of the invention as follows. In the description, reference is made to accompanying drawings, which form apart thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIGS. 6A to 6E are views illustrating a captured image of a CMS camera and an output image of a CMS display for a CMS wide-angle view mode, of present embodiments.

DESCRIPTION OF THE EMBODIMENTS

Hereinafter, embodiments of the present invention will be described in detail with reference to the attached drawings.

Figure 1:
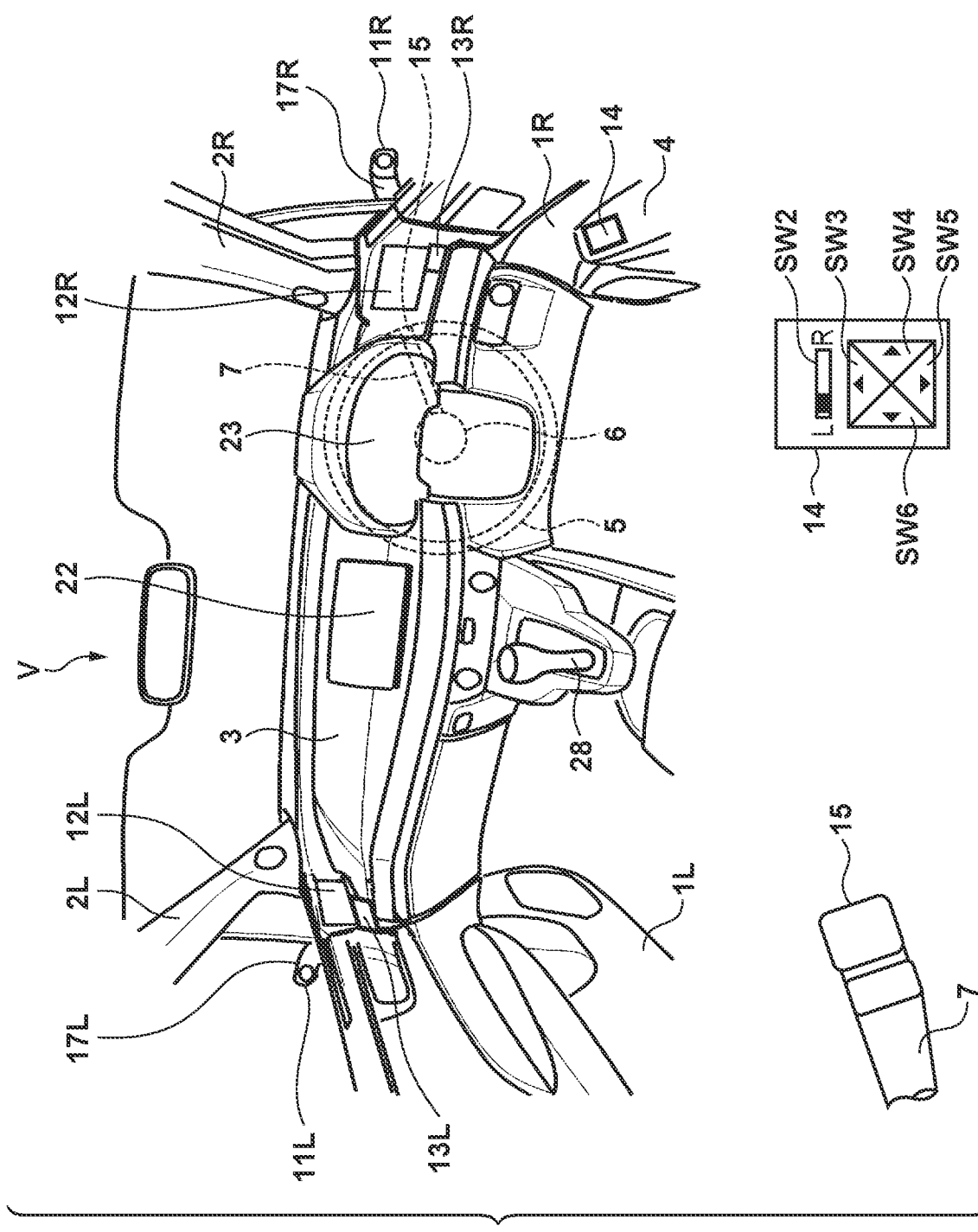
FIG. 1 is an external view of a structure around a dashboard of a vehicle on which a CMS of present embodiments is mounted, as seen from the inside of the vehicle.
Figure 2:
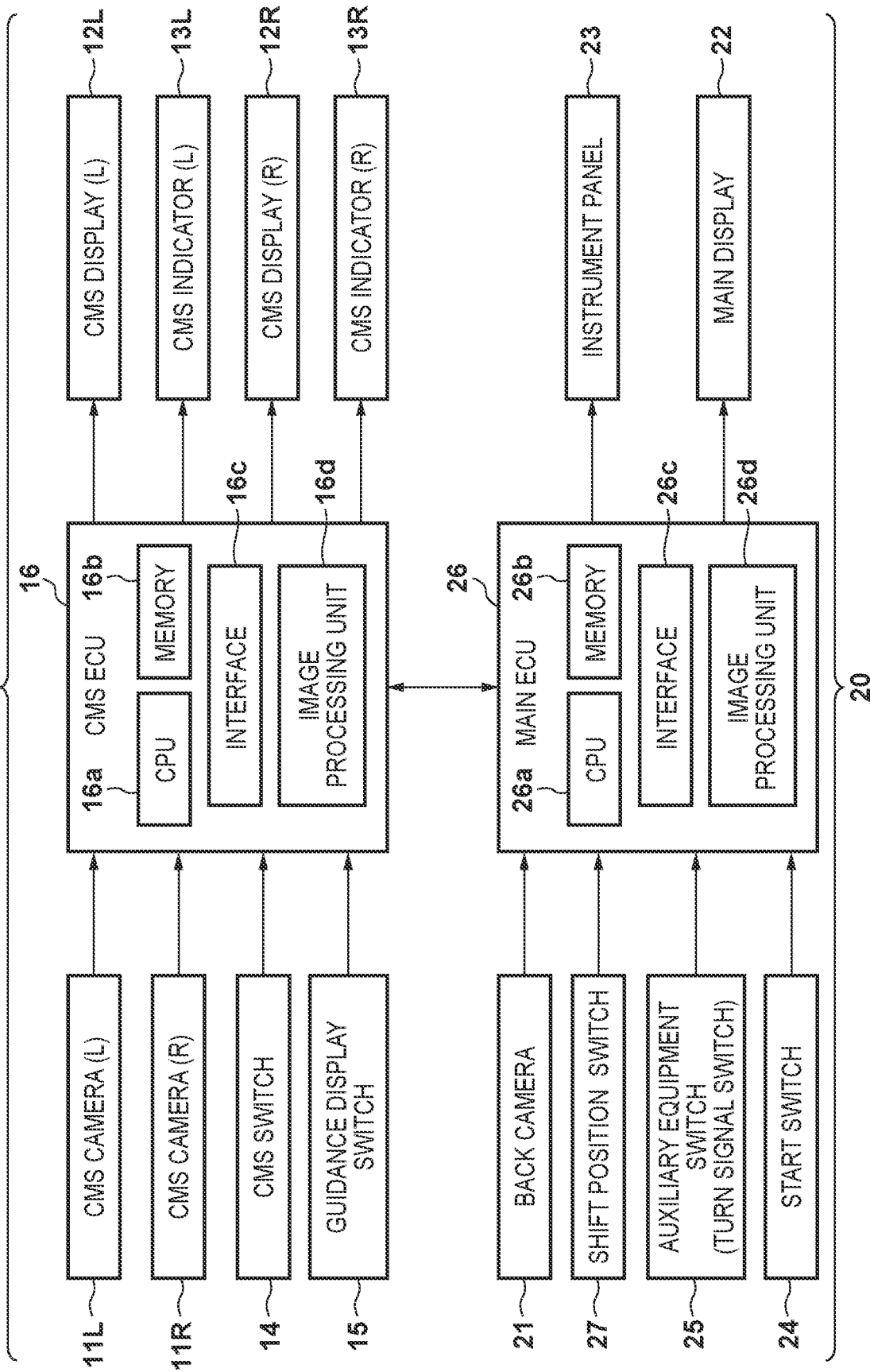
FIG. 2 is a system configuration diagram of the CMS of present embodiments.

FIG. 1 is an external view of structures around a dashboard of a vehicle in which a CMS of present embodiments is installed, as seen from the inside of the vehicle. FIG. 2 is a system configuration diagram of the CMS of present embodiments.

The vehicle of the present embodiment is an automobile, a hybrid automobile, an electric automobile, or the like whose driving source is an internal combustion engine. In the vehicle of the present embodiment, a main system for controlling the vehicle overall and the CMS (Camera Monitor System) which is for displaying images of what is to the side rear of the self-vehicle V in place of a door mirror are mounted as an image display apparatus or a driving support apparatus. The CMS 10 includes CMS cameras 11L and 11R for capturing images of what is to the side rear of the self-vehicle V, CMS displays 12L and 12R for displaying images captured by the CMS cameras 11L and 11R, indicators 13L and 13R, a CMS switch 14, a guidance display switch 15, and a CMS ECU 16. The CMS 10 is communicatively connected to a main system 20 of the vehicle. The main system 20 includes a back camera 21 that captures an image of what is to the rear of the self-vehicle V, a main display 22 that displays an image (back camera image) captured by the back camera 21, an instrument panel 23, a start switch 24, an auxiliary equipment switch 25, and a main ECU 26, as components that cooperate with the CMS 10.

First, referring to FIG. 1 and FIG. 2, the CMS 10 of the present embodiment will be described.

Figure 4:
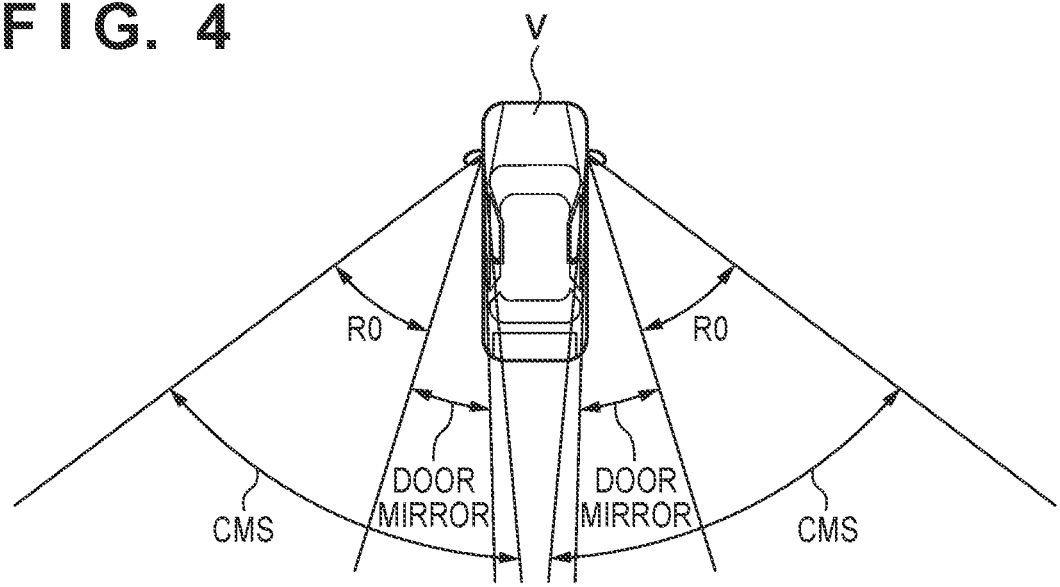
FIG. 4 is a view illustrating a comparison between a view range of the CMS and a view range of door mirrors.

The CMS cameras 11L and 11R are attached to the outer surfaces of the left and right front doors 1L and 1R or near the lower ends of the front pillars 2L and 2R via stays 17L and 17R. The CMS cameras can capture what is to the side rear of the self-vehicle V. The CMS camera 11L on the left side captures images of what is to the left and to the rear of the self-vehicle V. The CMS camera 11R on the right side captures images of what is to the right and to the rear of the self-vehicle V. FIG. 4 illustrates ranges (view ranges) that can be captured by the CMS cameras 11L and 11R of the present embodiment.

The CMS displays 12L and 12R are provided at left and right side end portions of a dashboard 3 provided in the vehicle width direction at the front of the vehicle interior. The CMS display 12L on the left side corresponds to the CMS camera 11L on the left side, and displays an image captured by the CMS camera 11L on the left side. The CMS display 12R on the right side corresponds to the CMS camera 11R on the right side, and displays an image captured by the CMS camera 11R on the right side.

CMS indicators 13L and 13R are provided adjacent to the lower portions of the left and right CMS displays 12L and 12R, respectively.

A CMS switch 14 is provided on an armrest 4 on the right side (the driver side) of vehicle interior side of the front door. As illustrated in FIG. 1, the CMS switch 14 includes a display selection switch SW2 of a slide type for selecting one of the left and right CMS displays 12L and 12R, and a switch of a push button type composed of four directional buttons SW3 to SW6 for up, down, left and right. The CMS switch 14 may be provided on the instrument panel 23.

The guidance display switch 15 is provided at the distal end of a lever portion of a turn signal switch 7 provided in a steering column 6. The guidance display switch 15 is a switch for displaying later-described distance indicators so as to be superimposed on an image (CMS image) displayed on the left and right CMS displays 12L and 12R.

Next, referring to FIG. 1 and FIG. 2, an internal configuration of the CMS 10 of the present embodiment will be described.

The CMS ECU 16 includes a CPU 16a, a memory 16b, an interface 16c, and an image processing unit 16d. The CMS ECU 16 is connected to the left and right CMS cameras 11L and 11R, the left and right CMS displays 12L and 12R, the left and right CMS indicators 13L and 13R, the CMS switch 14, the guidance display switch 15, and the main ECU 26, and controls the CMS 10.

The CPU 16a is a processor for performing various arithmetic processes relating to the control of the CMS 10. The memory 16b stores programs and parameters for the CPU 16a, drawing data for guidance lines and icons, image data, and the like. The interface 16c inputs and outputs signals to and from the respective components of the CMS 10 and the main ECU 26. The image processing unit 16d is a processor that performs predetermined image processing on the image data captured by the left and right CMS cameras 11L and 11R, generates an image signal for display, and outputs the image signal to the left and right CMS displays 12L and 12R. The predetermined image processing is, for example, resizing processing, enlargement/reduction processing, superimposition processing, or the like. The resizing processing is a process for cutting out image data to be displayed on the left and right CMS displays 12L and 12R from image data captured by the left and right CMS cameras 11L and 11R. The enlargement/reduction processing is processing for enlarging or reducing the resized image data in accordance with the size of the display regions of the CMS displays 12L and 12R. In the present embodiment, the enlargement/reduction processing is a process of compressing/reducing image data resized in a wide-angle view mode, which will be described later, in accordance with the shape/size of a display region of a CMS display to generate a wide-angle (wide) image. The superimposition processing is a process of generating a composite image in which guidance lines and icons, which will be described later, are superimposed onto CMS images to be displayed on the CMS displays 12L and 12R.

The CMS indicators 13L and 13R have light-emitting units such as LEDs, and the CMS ECU 16 controls lighting of the CMS indicators 13L and 13R to display operation states of the CMS 10 and the like.

The CMS cameras 11L and 11R include lenses, image sensors, A/D converter circuits, and the like, and the CMS ECU 16 controls image capturing operations of the image sensors. The captured data is output to the image processing unit 16d and subjected to various image processing. Since the CMS cameras 11L and 11R of the present embodiment are fixed lenses, a wide-angle image in a wide-angle view mode, which will be described later, is generated by the image processing unit 16d. The CMS cameras 11L and 11R of the present embodiment may be equipped with a zoom lens to provide an optical zoom function, or may be equipped with a fish-eye lens capable of capturing a wider range. In the case of using a fish-eye lens, an image captured at an angle of view of 180° is transformed in accordance with the size of the display region of the CMS display, and then a part of the image is cut out to generate a wide-angle image.

The CMS displays 12L and 12R are composed of a display device such as a liquid crystal panel, an organic EL panel, or the like and display CMS images captured by the CMS cameras 11L and 11R and subjected to image processing.

Next, referring to FIG. 1 and FIG. 2, the main system 20 of the present embodiment will be described.

The main system 20 controls the vehicle overall. In the present embodiment, elements related to the CMS 10 are described, and descriptions of other components are omitted.

The main ECU 26 is connected to the back camera 21, the main display 22, the instrument panel 23, the start switch 24, the auxiliary equipment switch 25, the shift position switch 27, and the CMS ECU 16, and controls the vehicle overall.

The back camera 21 is provided in the vicinity of a license plate such as on a back door for opening and closing a tailgate that opens to the rear of the vehicle body, and captures an image of what is to the rear of the self-vehicle V.

The main display 22 is provided in the vicinity of the center of the dashboard 3 in the vehicle width direction. The main display 22 displays a screen of the car navigation apparatus, a back camera image captured by the back camera 21, and the like. The main display 22 and the CMS displays 12L and 12R are provided at different positions in the dashboard 3 at predetermined intervals.

The instrument panel 23 is provided in front of a steering wheel 5 on the dashboard 3.

The start switch 24 notifies the main ECU 26 of an operation signal of a start switch 24 for starting or stopping the main system 20. Note that in a vehicle whose driving source is an internal combustion engine, such as a gasoline engine, the switch may be referred to as an ignition switch.

The auxiliary equipment switch 25 is provided on the instrument panel 23 and the steering column 6, and notifies the main ECU 26 of an operation signal of the auxiliary equipment switch 25, such as for headlights, turn signal lights, and wipers.

A shift position switch 27 detects the position (park (P range), neutral (N range), forward range (1st range, 2nd range, D range), reverse (R range), etc.) of a select lever 28, and notifies the main ECU 26 of the detected position.

The main ECU 26 includes a CPU 26a, a memory 26b, an interface 26c, and an image processing unit 26d.

The CPU 26a is a processor for performing various arithmetic processes relating to the control of the vehicle overall. The memory 26b stores programs and parameters for the CPU 26a, drawing data for guidance lines and icons, image data, and the like. The interface 26c inputs and outputs signals to and from the respective components of the main system 20 and the CMS ECU 16. The image processing unit 26d is a processor that performs predetermined image processing on the image data captured by the back camera 21, generates an image signal for display, and outputs the image signal to the main display 22. The predetermined image processing is, for example, resizing processing, superimposition processing, or the like. The resizing processing is a process for cutting out image data to be displayed on the main display 22 from image data captured by the back camera 21. The superimposing processing is a process for generating a composite image in which guidance lines and icons, which will be described later, are superimposed onto a back camera image to be displayed on the main display 22.

When it is notified from the shift position switch 27 that the position of the select lever 28 has been switched to reverse (R range), the main ECU 26 captures an image of the rear of the self-vehicle V by the back camera 21, and displays the captured image on the main display 22.

The CMS ECU 16 and the main ECU 26 may be configured individually, or may be configured by integrating CMS ECU 16 functions into the main ECU 26.

<CMS 10 Control Processing>

Figure 3A:
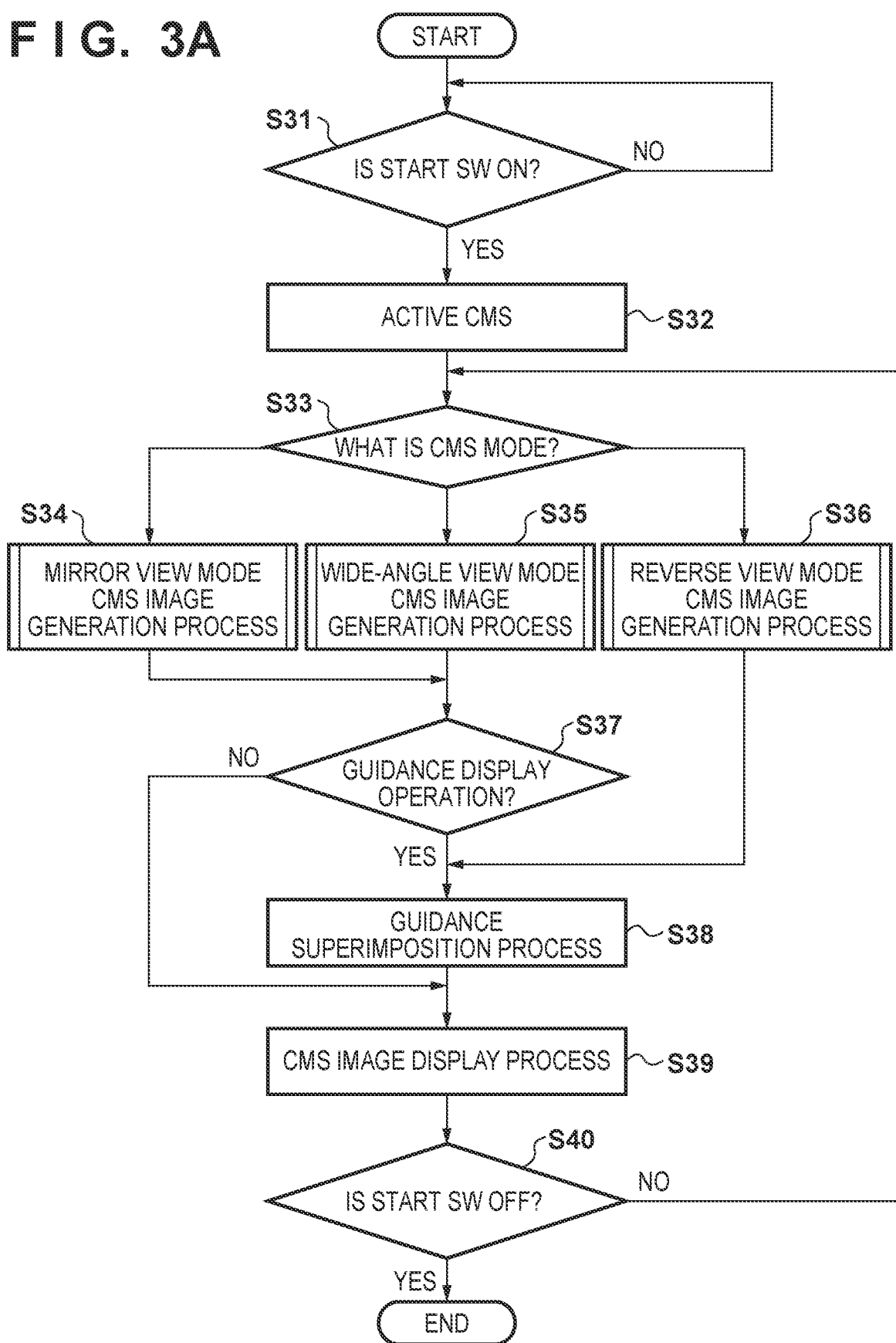
FIGS. 3A and 3B are flowcharts illustrating a control process of the CMS of present embodiments.
Figure 3B:
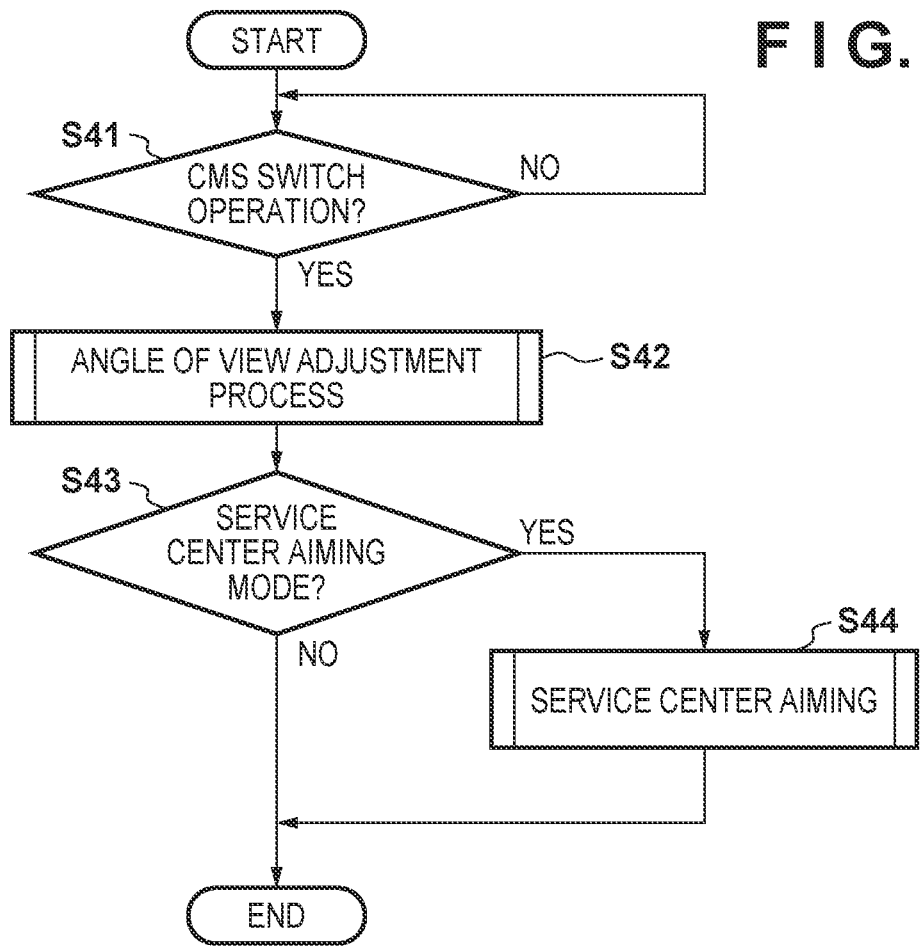

Next, referring to FIGS. 3A and 3B, control processing of the CMS 10 of the present embodiment will be described. FIG. 3A is a flowchart illustrating a guidance line superimposing process (CMS image display process) in the CMS of the present embodiment. FIG. 3B is a flowchart illustrating an aiming process (angle of view adjustment) in the CMS of the present embodiment.

It should be noted that the processes of FIGS. 3A and 3B are realized by the CPU 16a of the CMS ECU 16 executing CMS control programs stored in the memory 16b, communicating with the main ECU 26, and controlling the respective components of the CMS 10.

First, referring to FIG. 3A, the guidance line superimposing process (CMS image display process) in the CMS of the present embodiment will be described.

When the start switch 24 is turned on in step S31, the process is started. When the start switch 24 is turned on, the main ECU 26 notifies the CMS ECU 16 that the start switch 24 was turned on, and the CMS ECU 16 performs activation process of the system (step S32).

In step S33, the CMS ECU 16 determines the CMS mode. The CMS mode may be a mirror view (narrow angle) mode, a wide-angle view mode, or a reverse view mode, and the user can select the mirror view mode or the wide-angle view mode by a navigation screen displayed on the main display 22 or the like. The CMS mode is configured to be appropriately adjustable, and in addition, it is possible to set in advance, as a user setting, the mirror view mode and the wide-angle view mode, store the setting in the memory 16b, and, upon restart, read out from the memory 16b whether the set state was the wide-angle view mode or the mirror view mode the last time, and restore that state. However, switching to the reverse view mode is performed only when the select lever 28 is switched to reverse. When the CMS mode is switched between the mirror view mode and the wide-angle view mode, the CMS images are temporarily displayed in a single color (e.g., black) during the mode switching or after the switching is completed. As a result, the user can be notified that the mode is being switched or that the mode has been switched. It should be noted that a mode change before starting movement is possible, but a mode change during traveling is impossible. Therefore, the user changes the mode before starting movement. The reverse view mode is switched to when the position of the select lever 28 is switched to reverse (R range).

In step S34, the CMS ECU 16 transitions to the mirror view mode. In the mirror view mode, the image processing unit 1d generates image data to be displayed on the left and right CMS displays 12L and 12R from image data captured by the left and right CMS cameras 11L and 11R.

In step S35, the CMS ECU 16 transitions to the wide-angle view mode. In the wide-angle view mode, the image processing unit 16d generates a wide-angle image by compressing/reducing a part of the region of the resized image data in accordance with the shape/size of the display region of the CMS displays 12L and 12R.

In step S36, the CMS ECU 16 transitions to the reverse view mode. In the reverse view mode, the image processing unit 16d generates image data to be displayed on the left and right CMS displays 12L and 12R from image data captured by the left and right CMS cameras 11L and 11R. In the reverse view mode, the main ECU 26 generates, by the image processing unit 26d, image data to be displayed on the main display 22 from the image data captured by the back camera 21.

In step S37, in the mirror view mode or the wide-angle view mode, the CMS ECU 16 determines whether the turn signal switch 7 or the guidance display switch 15 has been operated, and if either of the switches has been operated, in step S38, the image processing unit 16d generates a composite image in which guidance lines, which will be described later, have been superimposed on the CMS images. Drawing data for the guidance lines is stored in the memory 16b. In the reverse view mode, the image processing unit 26d of the main ECU 26 generates a composite image in which guidance lines (described later) are superimposed on the back camera image. Drawing data for the guidance lines is stored in the memory 26b.

In step S39, the CMS ECU 16 displays the images generated in either step S34 or step S35 or the composite images generated in step S38 on the left and right CMS displays 12L and 12R. In the reverse view mode, the main ECU 26 displays the images generated in step S36 or the composite images generated in step S38 on the main display 22. In the case where the CMS mode is the reverse view mode, CMS images are displayed on the left and right CMS displays 12L and 12R, and at the same time, an image (back camera image) captured by the back camera 21 is displayed on the main display 22.

When the guidance display switch 15 is operated in step S37 or when an operation to turn on a turn signal for a limited period (one-touch turn signal) was performed on the turn signal switch 7, the CMS ECU 16 starts timer-counting and turns off the superimposed display of the guidance lines after a predetermined period has elapsed. In addition, the superimposed display of the guidance lines is continued during a period in which the turn signal switch 7 is turned on in a case where it is turned on and then turned back off (during a normal turn signal operation) or during the reverse view mode.

In step S40, the CMS ECU 16 repeats the processes in step S33 and subsequent steps until the start switch 24 is turned off, and when the start switch 24 is turned off, process to shut down the CMS 10 is performed to stop the system.

Note that, in step S40, the CMS ECU 16 stores, in the memory 16b, setting information, such as an angle of view of the CMS images or the back camera image, for immediately before the start switch 24 is turned off, reads the previous setting information from the memory 16b when the start switch 24 is subsequently turned on, and starts displaying the CMS image or the back camera image in the same manner as with the previous setting information. As a result, it is possible to display images with the previously set angle of view when the system is restarted, and it is possible to avoid the effort of resetting.

Next, referring to FIG. 3B, a self-aiming (angle of view adjustment) process in the CMS according to the present embodiment will be described. Note that the activation process of FIG. 3B is completed when the CMS is started and the CMS images are being displayed.

In step S41, the CMS ECU 16 determines whether the display selection switch SW2 of the CMS switch 14 is operated, and either the left or right CMS displays is selected, and when the display selection switch SW2 is operated, in step S42, the CMS ECU 16 transitions to the self-aiming mode to adjust the angle of view of the CMS images to display on the CMS displays 12L and 12R according to the operation by the user on CMS switch 14. The image processing unit 16d generates and displays image data to be displayed on the CMS display 12L or 12R from the image data captured by the corresponding CMS camera 11L or 11R in accordance with a view range set by the four directional switches SW3 to SW6 of the CMS switch 14 for either of the left and right CMS displays 12L and 12R selected by the display selection switch SW2.

In step S43, the CMS ECU 16 determines whether or not an operation for transitioning into the service center aiming mode has been performed, and if the operation for transitioning into the service center aiming mode has been performed, in step S44, service center aiming is performed. Specifically, in a normal state (when only the CMS switch 14 is operated), the self-aiming mode (step S42) is always set, and when the four directional switches of the CMS switch 14 and the guidance display switch 15 are simultaneously pressed, the mode is transitioned to the service center aiming mode. Details will be described later. When service center aiming in step S44 is completed, the CMS ECU 16 ends the process of FIG. 3B. When the operation for transitioning to the service center aiming mode is not performed in step S43 (NO in step S43), the process of FIG. 3B is also terminated.

<Image Display Process in CMS Mode (Step S39 in FIG. 3A)>

Next, referring to FIGS. 4 to 8C, an image display process according to the CMS mode will be described.

FIG. 4 is a view that illustrates ranges (image capturing angles) that can be captured by the CMS cameras 11L and 11R of the present embodiment.

The image processing unit 16d of the CMS ECU 16 cuts out/extracts image data to be displayed on the left and right CMS displays 12L and 12R from the image data of the capture ranges illustrated in FIG. 4 captured by the left and right CMS cameras 11L and 11R, generates CMS images by compressing/reducing the image data of a part of the region as required, and displays the CMS images on the CMS displays 12L and 12R.

(Mirror View Mode (Step S34 in FIG. 3A))

Figure 5B:
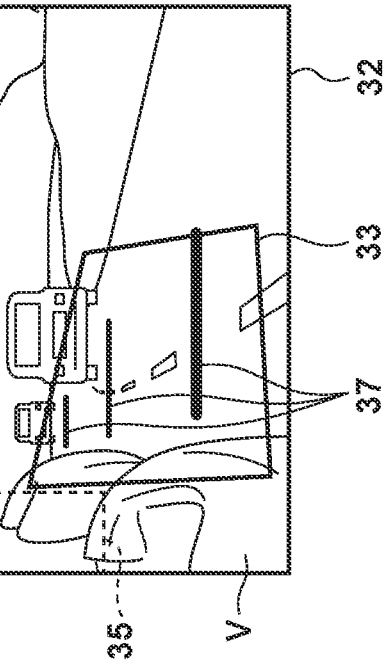
FIGS. 5A and 5B are views illustrating a captured image of a CMS camera and an output image of a CMS display for when a CMS mode is a mirror view mode, of present embodiments.
Figure 5A:
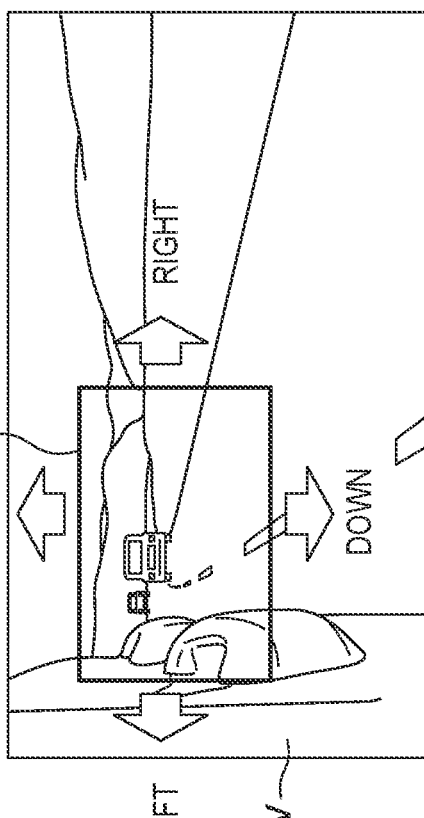

FIGS. 5A and 5B are views illustrating an image captured by a CMS camera and an image output (CMS image) by a CMS display when the CMS mode is the mirror view mode, of the present embodiment. Although examples of the right side CMS camera and CMS display are illustrated in FIGS. 5A and 5B, the same applies to the left side CMS camera and CMS display, and images captured by the left and right CMS cameras 11L and 11R are displayed on the left and right CMS displays 12L and 12R.

In the mirror view mode, as illustrated in FIG. 5A, the image processing unit 16d of the CMS ECU 16 cuts out a region 31 corresponding to the size of a display region 32 of the CMS display 12R from an image 30 captured by the CMS camera 11R, and generates a CMS image resized in accordance with the size of the display region 32 of the CMS display 12R. The CMS image generated by the image processing unit 16d of the CMS ECU 16 is displayed on the entire display region 32 of the display 12R.

In the display region 32 of the CMS display 12R, a display region (legal area) 33 for which a predetermined legal field of view is defined in advance by a law or the like is set. The predetermined legal field of view is a region that should be visible to the driver during driving, for example, in accordance with the rules set forth by the United Nations Economic Commission for Europe, and that region is plotted onto the display region of the CMS display 12R. For example, this corresponds to the field of view defined in Section 15 of Chapter II of UN/ECE R46. The line of sight of the driver, which is a reference therefor, is assumed to be defined based of "The driver's ocular points (driver's eye position)" described in Section 12 of Chapter II of ECE/TRANS/WP. 29/2015/84 on https://www.unece.org/trans/main/wp29/wp29wgs/wp29gen/gen2015.html.

The display region 32 of the CMS display 12R is provided with an icon display region 35 in which a mirror view icon 34 indicating the mirror view mode is displayed. The mirror view icon 34 is superimposed on the CMS image by the image processing unit 16d, and displayed for a predetermined time (e.g., 3 seconds) at the time of mode switching. With the initial setting, the icon display region 35 is disposed at a position which does not overlap with the legal area 33 and at an upper portion of a side end portion of the display region 32 of the CMS display 12R that overlaps with the self-vehicle V so not to shield objects in the CMS image. In addition to the mirror view icon 34, an icon indicating the state, such as that the field of view is being adjusted, that it is impossible to adjust the field of view, that there is a screen abnormality (at a high temperature or at a low temperature), and the like is also displayed in the icon display region 35 as necessary.

In the wide-angle view mode, as will be described in detail, guidance lines 37 are superimposed on the CMS image in conjunction with the operation of the turn signal switch 7 and the guidance display switch 15. The guidance lines 37 are an indicator for indicating a measure of the distance from the side of the self-vehicle V (CMS camera) to the rear.

(Angle of View Adjustment Process (Step S42 in FIG. 3B))

By operating the CMS switch 14, the user can move the position of the image displayed in the display region 32 of the CMS display 12R up, down, left, and right in a similar manner to a conventional door mirror, and the user (e.g., a driver) can adjust to a desired view range. The user, by setting the display selection switch SW2 of the CMS switch 14 to either the right or the left, can select either the left or the right CMS display 12L or 12R as an adjustment target, and by pressing the four directional buttons SW3 to SW6, can move the view range of the CMS image up, down, left, and right for the CMS display 12L or 12R selected as the adjustment target. The image processing unit 16d generates a CMS image corresponding to the cut-out region 31 set by the four-directional buttons SW3 to SW6 of the CMS switch 14 from the image 30 captured by the CMS camera 11R, and displays the CMS image in the display region 32 of the display 12R.

(Wide-Angle View Mode (Step S35 in FIG. 3A))

FIGS. 6A to 6D are views illustrating images captured by a CMS camera and images (CMS image) output by a CMS display when the CMS mode is the wide-angle view mode, of the present embodiment. Although examples of the right side CMS camera and CMS display are illustrated in FIGS. 6A to 6D, the same applies to the left side CMS camera and CMS display, and images captured by the left and right CMS cameras 11L and 11R are displayed on the left and right CMS displays 12L and 12R.

In the wide-angle view mode, as illustrated in FIG. 6A, the image processing unit 16d of the CMS ECU 16 cuts out a region 41 corresponding to the size of the display region 42 of the CMS display 12R from an image 40 captured by the CMS camera 11R, and generates a CMS image resized in accordance with the size of the display region 42 of the CMS display 12R. The cut-out region 41 has a first cut-out region 41a of a rectangular shape for cutting out a mirror view image (narrow-angle image) and a second cut-out region 41b of a trapezoidal shape for cutting out a wide-angle image, and a CMS image corresponding to the first cut-out region 41a generated by the image processing unit 16d of the CMS ECU 16 and a CMS image corresponding to the second cut-out region 41b are displayed in the display region 42 of the display 12R.

The display region 42 of the CMS display 12R is divided into a mirror view region 42a for displaying a CMS image corresponding to the first cut-out region 41a and a wide-angle view region 42b for displaying a CMS image corresponding to the second cut-out region 41b, as illustrated in FIGS. 6B to 6D.

The image processing unit 16d of the CMS ECU 16 generates a mirror view image, which is re-sized according to the size of the mirror view region 42a of the image 40 captured by the CMS camera 11R, and a wide-angle view image, which is re-sized according to the wide-angle view region 42b. The mirror view image is displayed in the mirror view region 42a of the CMS display 12R, and the wide-angle view image is displayed in the wide-angle view region 42b of the CMS display 12R. The wide-angle view image is a wide-angle image obtained by compressing/reducing the image data cut out in accordance with the cut-out region 41b corresponding to the wide-angle view region 42b of the CMS display 12R in the image data 40 captured by the CMS camera 12R in accordance with the shape/size of the wide-angle view region 42b, and the wide-angle view image has a magnification that is different from that of the mirror view image.

The mirror view region 42a is provided at a position close to the self-vehicle V in the display region 42 of the CMS display 12R (the vehicle side), and the wide-angle view region 42b is provided at a position far from the self-vehicle V in the display region 42 of the CMS display 12R (the side away from the vehicle). The mirror view region 42a and the wide-angle view region 42b are provided adjacent to each other in the display region 42 of the CMS display 12R. Further, a legal area 43 is set in the mirror view region 42a.

The CMS display is not limited to a form in which the display region is divided into two, and the CMS display may be divided into three or more regions, having guaranteed the legal area.

In addition, a dividing line 45 is distinguishably displayed at a boundary portion between the mirror view region 42a and the wide-angle view region 42b in the display region 42 of the CMS display 12R. As a result, the user can recognize that the wide-angle view image is an image having a different magnification from the mirror view image, and erroneous recognition of an object present on the side of the self-vehicle V can be prevented.

The display region 42 of the CMS display 12R is provided with an icon display region 48 in which a wide-angle view icon 44 indicating the wide-angle view mode is displayed. The wide-angle view icon 44 is superimposed on the mirror view image of the mirror view region 42a by the image processing unit 16d, and displayed for a predetermined time (e.g., 3 seconds) at the time of mode switching. The icon display region 48 is disposed at a position which does not overlap with the legal area 43 and at an upper portion of a side end portion of the display region 42 of the CMS display 12R that overlaps with the self-vehicle V so not to shield objects in the mirror view image. In addition to the wide-angle view icon 44, icons indicating the state, such as that the field of view is being adjusted, that it is impossible to adjust the field of view, that there is a screen abnormality (at a high temperature or at a low temperature), and the like is also displayed in the icon display region 48 as necessary.

(Angle of View Adjustment Process (Step S42 in FIG. 3B))

By operating the CMS switch 14, the user can move the position of the image displayed in the display region 42 of the CMS display 12R up, down, left, and right in a similar manner to a conventional door mirror, and the user (e.g., a driver) can adjust to a desired view range. The user, by setting the display selection switch SW2 of the CMS switch 14 to either the right or the left, can select either the left or the right CMS display 12L or 12R as an adjustment target, and by pressing the four directional buttons SW3 to SW6, can move the view range of the CMS image up, down, left, and right for the CMS display 12L or 12R selected as the adjustment target. The image processing unit 16d generates a mirror view image and a wide-angle view image corresponding to the first cut-out region 41a and the second cut-out region 41b of the cut-out region 41 set by the four-directional buttons SW3 to SW6 of the CMS switch 14 from the image 40 captured by the CMS camera 11R, and displays these images in the mirror view region 42a and the wide-angle view region 42b of the display region 42 of the display 12R.

FIGS. 6B to 6D illustrate changes in the mirror view region 42a and the wide-angle view region 42b of the display region 42 of the display 12R when the cut-out region 41 is changed by the CMS switch 14 as in FIG. 6A. When the cut-out region 41 is changed in a direction from a position far from the self-vehicle V towards the self-vehicle V as in FIG. 6A, the area of the mirror view region 42a of the display region 42 of the display 12R is enlarged laterally away from the vehicle, and conversely, the area of the wide-angle view region 42b is reduced laterally away from the vehicle width. In FIG. 6D, a region 46 masked with a black image is displayed on the self-vehicle V side of the mirror view region 42a. This is because the mask region 46 corresponds to the inside of the vehicle body of the self-vehicle V, and does not need to be displayed as an image.

FIG. 6E illustrates a CMS image displayed in the display region 42 of the CMS display 12R in the wide-angle view mode.

(Guidance Line Superimposition Process (Step S38 in FIG. 3A))

In the wide-angle view mode, guidance lines can be displayed on the CMS image as illustrated in FIGS. 6B to 6D by the user operating the turn signal switch 7 or the guidance display switch 15. FIGS. 6B to 6D illustrate states in which the guidance lines 47 are superimposed on the CMS image in the wide-angle view mode.

The guidance lines 47 are controlled such that when the guidance display switch 15 is operated or when an operation to turn on a turn signal for only a limited period (one-touch turn signal) is performed rather than when the turn signal switch 7 is intermittently turned on and then off, the guidance lines 47 are displayed until a predetermined period of time elapses and then are hidden, but the guidance lines 47 are controlled to be hidden when the guidance display switch 15 or the turn signal switch 7 is temporarily operated again during the guidance line display. The display time when the operation to turn on the turn signal for a limited period is shorter than the display time when the guidance display switch 15 is turned on. For example, when the turn signal switch 7 is turned on by the operation to turn on the turn signal for a limited period of time, the display is for 3 seconds, and when the guidance display switch 15 is turned on, the display is for 5 seconds. In the present embodiment, if the turn signal switch 7 is intermittently turned on and then turned off, the display of the guidance line 47 is continued during the on period. It is also possible to set the display of the guidance lines 47 to be continued for a predetermined interval (e.g., 2 seconds) after the turn signal switch 7 is turned off in accordance with a setting by the user.

When an operation on the turn signal switch 7 is performed to turn on the turn signal for a limited period of time, it is considered that the user does not intend to confirm the surrounding situation for an extended period, and therefore, the display time of the guidance line 47 is shortened as compared with the case where the guidance display switch 15 is operated. Further, since it is considered that the user intends to confirm the surrounding situation for an extended period when the guidance display switch 15 is operated, the display time of the guidance line 47 is made longer than that when the turn signal switch 7 is operated to turn on the turn signal for a limited period of time.

While the turn signal switch 7 is in operation (the turn signal light is blinking), the guidance lines 47 are displayed preferentially regardless of operation on the guidance display switch 15, and the guidance lines 47 are hidden when the turn signal switch 7 is turned off. Configuration may be taken such that the guidance lines 47 are displayed only in the CMS image corresponding to the right or left direction in which the turn signal light is blinking, and they may be displayed in both the left and right CMS images.

The guidance lines 47 are an indicator for indicating a measure of the distance from the side of the self-vehicle V (CMS camera) to the rear, and are displayed so as to be superimposed onto the CMS images which are displayed on the CMS display. As a result, the positional relationship with the objects present in the surroundings of the self-vehicle V can be confirmed by the CMS images and the guidance lines 47.

The indicator is displayed, for example, as a plurality of horizontal guidance lines 47a to 47c at predetermined intervals at positions corresponding to actual distances (absolute distances) from the self-vehicle V. The guidance lines 47 are displayed, for example, at positions corresponding to distances from the rear end of the self-vehicle V (rear bumper end) of 3 m, 11 m, and 24 m respectively, in the CMS image. The display form of the guidance lines 47*a* to 47*c* (such as color and line type) is changed in accordance with the distance from the self-vehicle V. In FIGS. 6B to 6D, the guidance line 47*a* at the position closest to the self-vehicle V is displayed in red (a thick line) and the guidance lines 47*b* and 47*c* that are further away are displayed in yellow (thin lines) to alert the user. The user can easily understand the distance from an object to the side rear of the self-vehicle V when viewing the guidance lines 47*a* to 47*c*.

The guidance lines 47 are displayed only in the mirror view region 42*a* in the CMS display 12R, and are not displayed in the wide-angle view region 42*b*. This is because the wide-angle view image is different in magnification from the mirror view image, and when the guidance lines 47 are extended from the mirror view region 42*a* into the wide-angle view region 42*b*, the guidance lines in the wide-angle view region 42*b* become distorted; thus an erroneous recognition of the guidance lines due to distortion is avoided.

The far end, with respect to the vehicle laterally, of the guidance line 47*a* closest to the self-vehicle V is displayed so as to contact the dividing line 45. As a result, the guidance line 47*a* can be displayed at a large size, and the dividing line 45 can be easily visually recognized.

The transparency of the guidance lines 47 may be set so that an object overlapping with a guidance line can be visually recognized through the guidance line in the CMS image.

With such a configuration, it is possible to easily know the distance from an object present in the surroundings of the self-vehicle V. In particular, since the guidance lines 47 can be displayed by the guidance display switch 15 provided separately from the turn signal switch 7, convenience when the user desires to confirm the side rear in advance, such as in the case of a lane change, is improved.

Further, by providing the guidance display switch 15 in the turn signal switch 7, it is possible to smoothly indicate after using the guidance display switch 15 to display the guidance lines 47 and confirming the side rear on the left and right. In addition, by arranging operation units related to lane change operations close to each other, it is possible to prevent erroneous recognition of an operation.

(Reverse View Mode (Step S36 in FIG. 3A))

Figure 7B:
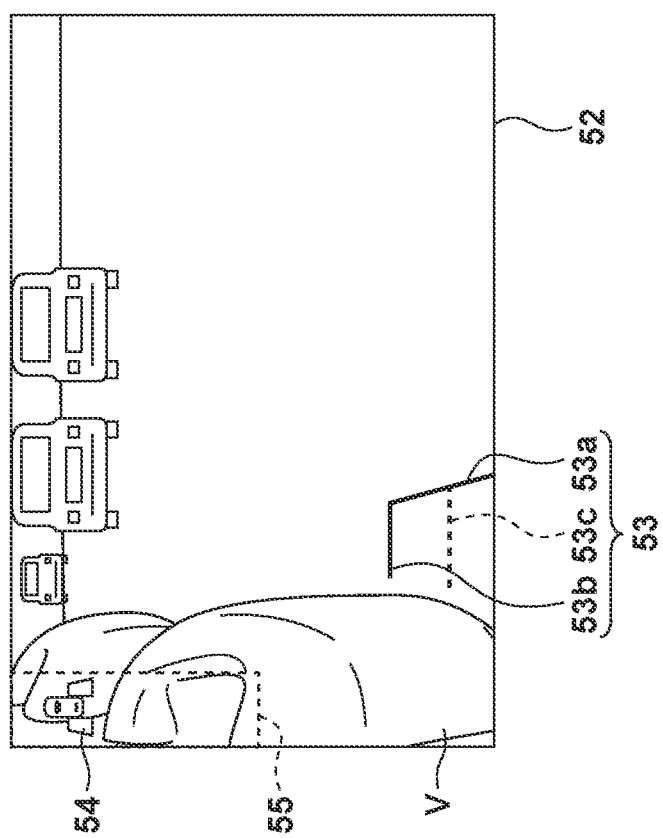
FIGS. 7A and 7B are views illustrating an image captured by a CMS camera and an image output by a CMS display for a CMS reverse view mode, of present embodiments.
Figure 7A:
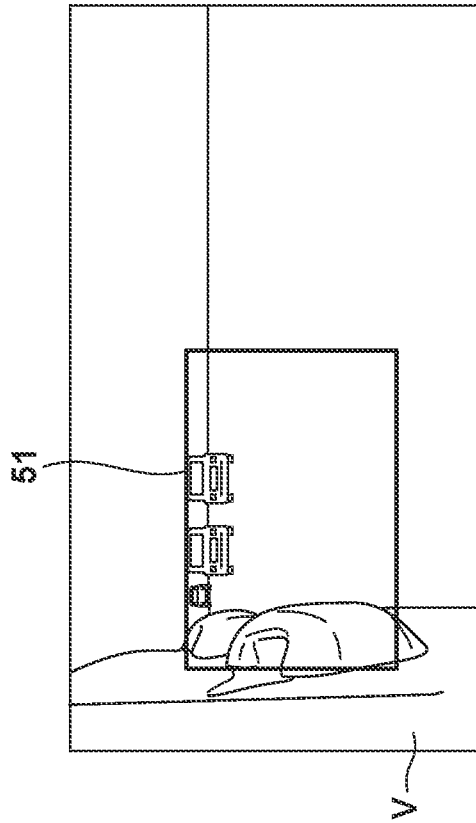

FIGS. 7A and 7B are views illustrating an image captured by a CMS camera and an image output (CMS image) by a CMS display when the CMS mode is the reverse view mode, of the present embodiment. Although examples of the right side CMS camera and CMS display are illustrated in FIGS. 7A and 7B, the same applies to the left side CMS camera and CMS display, and images captured by the left and right CMS cameras 11L and 11R are displayed on the left and right CMS displays 12L and 12R.

In the reverse view mode, as illustrated in FIG. 7A, the image processing unit 16*d* of the CMS ECU 16 cuts out a region 51 corresponding to the size of the display region 52 of the CMS display 12L from an image 50 captured by the CMS camera 11R, and generates a CMS image resized in accordance with the size of the display region 52 of the CMS display 12L. The CMS image generated by the image processing unit 16*d* of the CMS ECU 16 is displayed on the entire display region 52 of the display 12L.

The cut-out region 51 in the reverse view mode is a position shifted downward from the cut-out region 31 in the mirror view mode, and a CMS image of a lower part to the side rear of the self-vehicle V is generated. As a result, the angle of view can be adjusted so that the entirety of the guidance lines described later can be displayed.

The display region 52 of the CMS display 12L is provided with an icon display region 55 in which a reverse view icon 54 indicating the reverse view mode is displayed. The reverse view icon 54 is superimposed on the CMS image by the image processing unit 16*d*, and is constantly displayed when in reverse (the R range). The icon display region 55 is disposed at a position which overlaps the self-vehicle V and is at an upper portion of a side end portion of the display region 52 of the CMS display 12L, so not to shield objects in the CMS image. In addition to the reverse view icon 54, an icon indicating a state, such as that the field of view is being adjusted, that it is impossible to adjust the field of view, that there is a screen abnormality (at a high temperature or at a low temperature), and the like is also displayed in the icon display region 55 as necessary.

(Angle of View Adjustment Process (Step S42 in FIG. 3B))

The adjustment of the angle of view in the reverse view mode is limited to service center adjustment, but user (e.g., a driver) adjustment may be permitted. By operating the CMS switch 14 in such a case, the user can move the position of the image displayed in the display region 52 of the CMS display 12L up, down, left, and right in a similar manner to a conventional door mirror, and the user (e.g., a driver) can adjust to a desired view range. The user, by setting the display selection switch SW2 of the CMS switch 14 to either the right or the left, can select either the left or the right CMS display 12L or 12R as an adjustment target, and by pressing the four directional buttons SW3 to SW6, can move the view range of the CMS image up, down, left, and right for the CMS display 12L or 12R selected as the adjustment target. The image processing unit 16*d* generates a CMS image corresponding to the cut-out region 51 set by the four-directional buttons SW3 to SW6 of the CMS switch 14 from the image 50 captured by the CMS camera 11R, and displays the CMS image in the display region 52 of the display 12R.

(Guidance Line Superimposition Process (Step S38 in FIG. 3A))

Figure 8A:
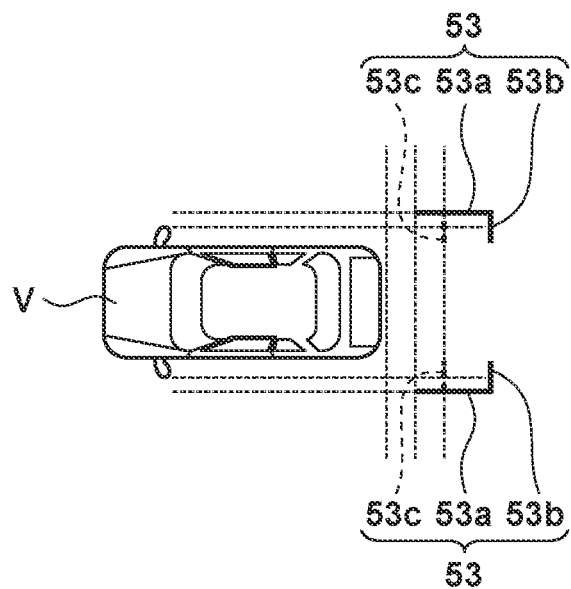
FIGS. 8A to 8C are views illustrating guidance lines that are superimposed on a CMS image and a back camera image for when a CMS mode of present embodiments is a reverse view mode.

In the reverse view mode, guidance lines can be displayed on the CMS image as illustrated in FIG. 7B and FIG. 8A by the user operating the guidance display switch 15. FIG. 7B illustrates a state in which guidance lines 53 are superimposed on the CMS image in the reverse view mode.

The guidance lines 53 are an indicator for indicating a measure of the distance from the side of the self-vehicle V (CMS camera) towards the rear, and are displayed so as to be superimposed on the CMS image which is displayed on the CMS display.

The guidance lines 53 are displayed in an F-shape on the CMS displays 12L and 12R as, for example, a first guidance line 53*a* parallel to the longitudinal direction of the vehicle body (direction perpendicular to the vehicle width direction) and at a predetermined distance (e.g., 0.25 m) from the left and right outermost sides (outer surface of the doors) of the self-vehicle V in the vehicle width direction at a position corresponding to an actual distance (absolute distance) from the self-vehicle V, a second guidance line 53*b* parallel to the vehicle width direction and at a predetermined distance (e.g., 1.0 m) from the rear end (rear bumper end) of the self-vehicle V, and a third guidance line 53*c* parallel to the vehicle width direction at a predetermined distance (e.g., 0.3 m) from the rear end of the self-vehicle V. The vertical and horizontal corners of the guidance lines 53 may be rounded. This makes it easier to grasp the distance from the self-vehicle V. The guidance lines 53 are displayed in a form easily distinguishable from the CMS image (for example, in yellow). As a result, the driver can easily grasp the distance from an object to the side rear of the self-vehicle V while viewing the guidance lines 53 when in reverse. The first guidance line 53a and the second guidance line 53b are displayed in the same color. As a result, visibility of the guidance lines can be improved, and erroneous recognition can be prevented.

The first guidance line 53a and the second guidance line 53b may be displayed in different forms (for example, the first guidance line 53a may be a solid line and/or a red line, and the second guidance line 53b may be a broken line and/or a yellow line).

As a result, it is possible to easily know the distance from objects present in the surroundings of the self-vehicle V. In particular, the user can confirm the distance to an object to the rear of the self-vehicle V by the first and second guidance lines 53a and 53b and can confirm whether or not there is enough a space to open and close the back door to the side rear of the self-vehicle V by the third guidance line 53c when going in reverse to the parking space, when going in reverse to the parking space from the parking space, and when parallel-parking/unparking, and the like.

Further, it is possible to reduce a difference in the sense of distance caused by the CMS displays 12L and 12R and the main display 22 being provided at positions different from each other with a predetermined interval therebetween.

The third guidance line 53c is displayed at a different distance from the rear end depending on the vehicle type of the self-vehicle V. For example, when the self-vehicle V is of a sedan type or the like, the third guidance line 53c is displayed as a broken line at a position at a first distance (0.5 m) from the rear end of the self-vehicle V. When the self-vehicle V is of a hatch-back type or the like, the third guidance line 53c is displayed by a broken line at a position at a second distance (0.9 m) from the rear end of the self-vehicle V obtained by adding 0.2 m to the length (0.7 m) of the back door in the rear of the vehicle body when fully opened. When the length to the rear of the vehicle body of the back door when fully opened exceeds 1.0 m, the third guidance line 53c is not displayed, and the second guidance line 53b is displayed by a solid line or a broken line at a position obtained by adding 0.2 m (1.2 m) to the length (1.0 m) of the back door to the rear of the vehicle body when fully opened.

With such a configuration, the user can confirm the distance to an object to the rear of the self-vehicle V by the first and second guidance lines 53a and 53b and can confirm whether or not there is enough a space to open and close the back door to the side rear of the self-vehicle V by the third guidance line 53c when going in reverse to the parking space, when going in reverse from the parking space, and when parallel-parking/unparking, and the like.

The shape (F shape) of the guidance line 53 superimposed on the CMS image is different from the shape (torii shape) of guidance lines 63 superimposed on the back camera image, which will be described later. In this manner, in the CMS image, the load of the display process on the CMS ECU 16 can be reduced by displaying only the shapes of the guidance lines 53 which are visible on the CMS display.

(Back Camera Image Display Process)

In the present embodiment, when the select lever is switched to reverse (R range), and the CMS mode is the reverse view mode, CMS images are displayed on the left and right CMS displays 12L and 12R, and at the same time, an image (back camera image) captured by the back camera 21 is displayed on the main display 22.

When the select lever is switched to reverse (the R range), the user can arbitrarily set the back camera image captured by the back camera 21 to be displayed on the main display 22, and the CMS image of at least one of the left and right CMS displays 12L and 12R to be non-displayed.

(Guidance Line Superimposition Process)

The main system 20 of the present embodiment can superimpose the display of the guidance lines 57 onto the back camera image.

Figure 8B:
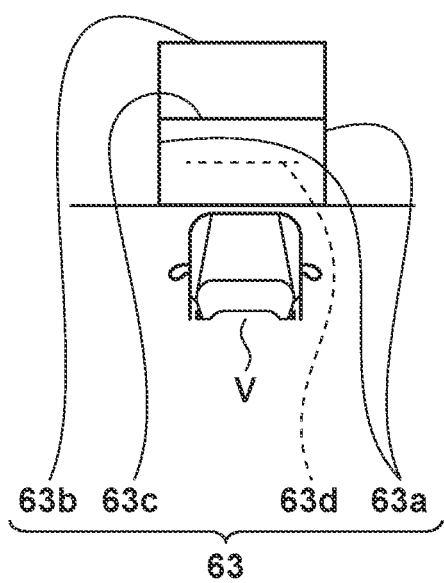

FIG. 8B is a view illustrating guidance lines that are superimposed on the back camera image in the reverse view mode of the present embodiment.

The guidance lines 63 are an indicator for indicating a measure of the distance to the side and the rear of the self-vehicle V (back camera 21), and are displayed so as to be superimposed on the back camera image.

The guidance lines 63 are displayed in a torii shape as, for example, a first guidance line 63a parallel to the longitudinal direction of the vehicle body (direction perpendicular to the vehicle width direction) and at a predetermined distance (e.g., 0.25 m) from the left and right outermost sides (outer surface of the doors) of the self-vehicle V in the vehicle width direction at a position corresponding to an actual distance (absolute distance) from the self-vehicle V, a second guidance line 63b parallel to the vehicle width direction and at a predetermined distance (e.g., 1.8 m) from the rear end (rear bumper end) of the self-vehicle V, a third guidance line 63c parallel to the vehicle width direction at a predetermined distance (e.g., 1.0 m) from the rear end of the self-vehicle V, and a fourth guidance line 63d parallel to the vehicle width direction at a predetermined distance (e.g., 0.5 m) from the rear end of the self-vehicle V. The vertical and horizontal corners of the guidance lines 63 may be displayed to be rounded. The guidance lines 63 are displayed in a form that is easily distinguishable from the back camera image (for example, in yellow). As a result, the driver can easily grasp the distance from an object to the side rear of the self-vehicle V while viewing the guidance lines 63 when in reverse. The first guidance line 63a, the second guidance line 63b, and the third guidance line 63c are displayed in the same color. As a result, visibility of the guidance lines can be improved, and erroneous recognition can be prevented.

The fourth guidance line 63d has a different distance displayed from the rear end depending on the vehicle type of the self-vehicle V. For example, when the self-vehicle V is of a sedan type or the like, the fourth guidance line 63d is displayed as a broken line at a position at a first distance (0.5 m) from the rear end of the self-vehicle V. When the self-vehicle V is of a hatch-back type or the like, the fourth guidance line 63d is displayed by a broken line at a position at a second distance (0.9 m) from the rear end of the self-vehicle V obtained by adding 0.2 m to the length (0.7 m) of the back door in the rear of the vehicle body when fully opened.

The first guidance line 63a and the second guidance line 63b may be displayed in different forms (for example, the first guidance line 63a may be a solid line and/or a red line, and the second guidance line 63b may be a broken line and/or a yellow line).

With such a configuration, it is possible to easily know the distance from an object present in the surroundings of the self-vehicle V. In particular, the user can confirm the distance to an object to the rear of the self-vehicle V by the first to third guidance lines 63a to 63c and can confirm whether or not there is enough a space to open and close the back door to the side rear of the self-vehicle V by the fourth guidance line 63*d* when going in reverse to the parking space, when going in reverse from the parking space, and when parallel-parking/unparking, and the like.

Figure 8C:
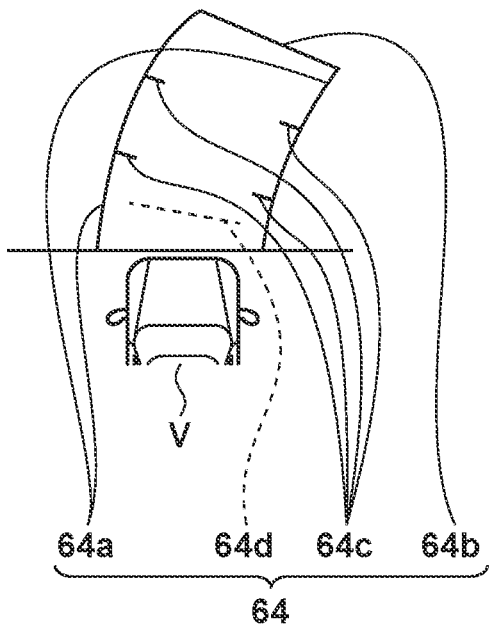

When going in reverse to the parking space while turning with respect to the parking space, as illustrated in FIG. 8C, the first guidance line 64*a* is displayed in a curved line as a path to the parking space, and the second guidance line 64*b* is displayed in a solid line at a predetermined distance (e.g., 3.0*m*) from the rear end of the self-vehicle V in parallel with the radial direction of curvature of the first guidance line 64*a*. In addition, a plurality of third guidance lines 64*c* extending from the first guidance lines 64*a* at predetermined intervals (e.g., 1.0 m) from the rear end of the self-vehicle V are displayed, and a fourth guidance line 64*d* corresponding to the length of the back door is also displayed. This facilitates reverse guidance during parking.

<Service Center Aiming Mode Setting Process (Step S43 and Step S44 in FIG. 3B)>

The CMS 10 of the present embodiment can be set to a service center aiming mode. In the service center aiming mode, deviation between the center of the vehicle body (the center for pitch, roll, yaw, etc.) at a time when a service worker has stopped the vehicle and an image capturing center (optical axis) of the CMS camera is corrected for (zero-point correction) using an aiming board for capturing at a service center, or the like.

The service center aiming mode can be transitioned into by simultaneously operating, for example, one of the four directional switches SW3 to SW6 of the CMS switch 14 and the guidance display switch 15 in step S43 of FIG. 3B. It is necessary to prevent the service center aiming mode from being inadvertently transitioned into by an unintended operation by the user. Therefore, by operating the four directional switches of the CMS switch 14 and the guidance display switch 15 at the same time, it is possible to transition into the service center aiming mode. Further, it is desirable that the operation direction be different between the four directional switches of the CMS switch 14 and the guidance display switch 15 (in the case of the push button type, the pressing direction), and that the positioning of the switches be in the same direction in the vehicle width direction with respect to the rotation center of the steering wheel 5, for example, in order to prevent an unnecessary mode transition considering the center position of the body of the driver. Note that the present invention is not limited to a guidance display switch 15 provided in the steering column, and a dedicated switch may be provided in the surroundings of the instrument panel.

With such a configuration, it is possible to prevent the user from inadvertently transitioning into the service center aiming mode by an unintended operation.

The CMS 10 of the present embodiment has a self-aiming mode in which the angle of view can be adjusted by the four directional switches of the CMS switch 14, and a service center aiming mode selected by the four directional switches of the CMS switch and the guidance display switch 15 being simultaneously pressed, and so the four directional switches of the CMS switch 14 are used both as a switches for adjusting the angle of view in self-aiming and switches for switching to service center aiming. Thus, the two modes can be used separately with the addition of only one switch, and it is possible to avoid an inadvertent transition into the service center aiming mode.

In addition, since the CMS switch 14 and the guidance display switch 15 cannot be operated at the same time unless the hand is removed from the steering wheel 5, it is possible to prevent erroneous operation during driving.

Also, since it is difficult to simultaneously operate the CMS switch 14 and the guidance display switch 15 when sitting in the seat, it is possible to prevent an erroneous operation during driving.

<Operation Procedure for Aiming>

Figure 9A:
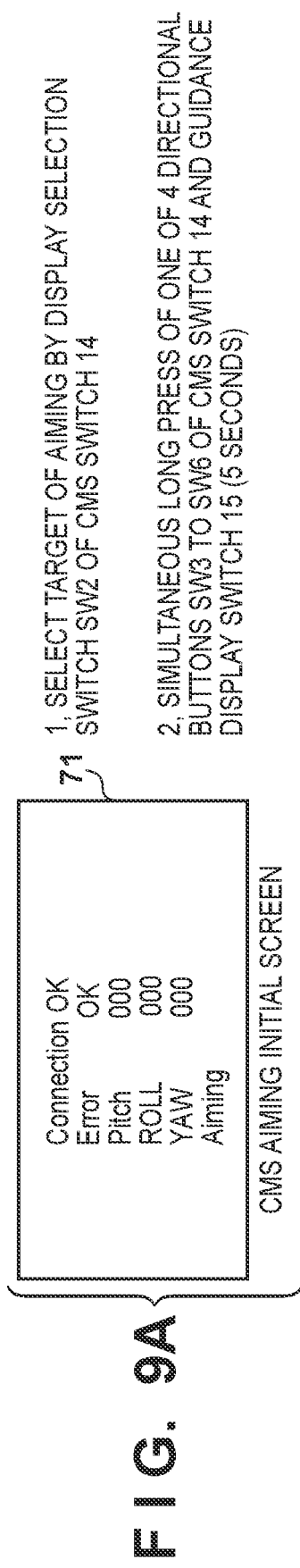
FIGS. 9A to 9C are views for explaining an operation procedure for a CMS aiming mode, of present embodiments.
Figure 9B:
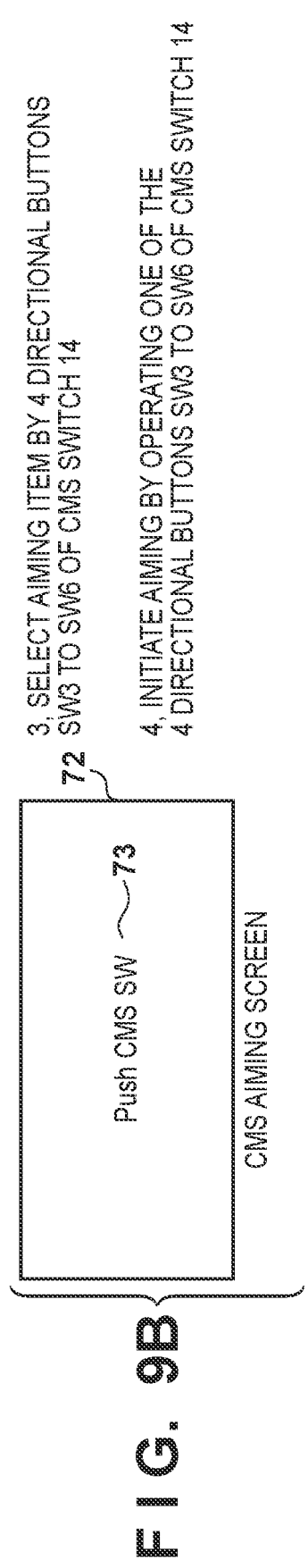
Figure 9C:
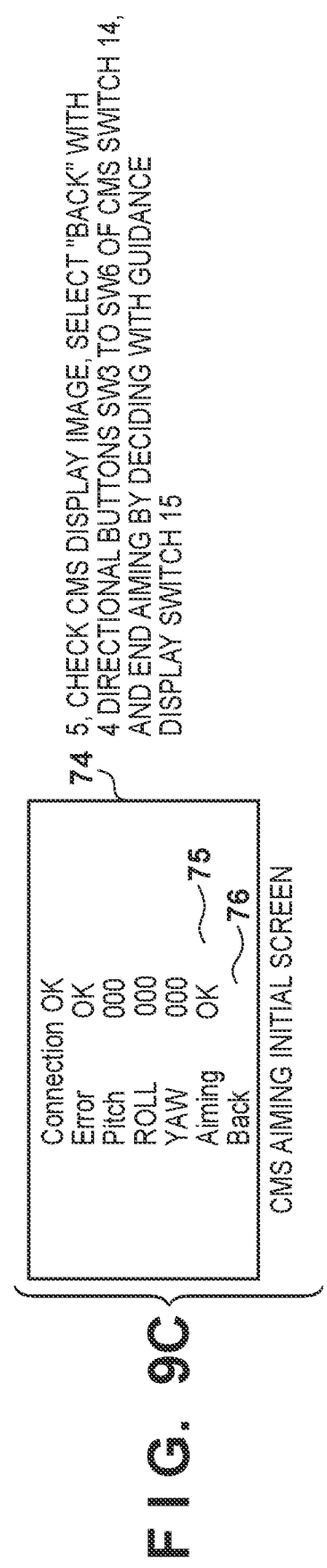

FIGS. 9A to 9C are views for explaining an example of an operation procedure for the CMS 10 service center aiming mode, of present embodiments.

(1) The user (service worker) switches the display selection switch SW2 of the CMS switch 14 to L or R to select either the CMS display 12L or 12R to be the target for aiming.

(2) Next, the user simultaneously presses the down-button SW5 of the CMS switch 14 and the guidance display switch 15 for 5 seconds. As a result, a CMS aiming initial screen 71 is displayed on the CMS display selected as the aiming target. A list of the aiming items is displayed on the CMS aiming initial screen. The aiming items include the direction in which correction is to be performed (pitch, roll, yaw, or the like).

(3) Next, the user operates the four directional buttons SW3 to SW6 of the CMS switch 14 to select one of the aiming items from the CMS aiming initial screen, and presses the guidance display switch 15 to decide upon item, and thereby switches to a CMS aiming screen 72.

(4) On the CMS aiming screen 72, a message 73 prompting the user to initiate aiming for the selected aiming item is displayed upon pressing the CMS switch 14. When the user presses any of the four directional buttons SW3 to SW6 of the CMS switch 14 in accordance with the messages, aiming is initiated.

(5) When the aiming is completed, the CMS image is displayed on the CMS display that is the target of aiming, the screen returns to the CMS aiming initial screen 74, and a message 75 such as "OK" or "NG" is displayed as the aiming result. The user operates the four directional buttons SW3 to SW6 of the CMS switch 14 to select an item 76 ("Back") corresponding to termination of the aiming from a CMS aiming list screen 74, and presses the guidance display switch 15 to decide upon the item 76, thereby ending the aiming mode.

The embodiment described above is an example as a means for realizing the present invention, and the present invention can be applied to modifications or variations of the embodiment described below without departing from the spirit thereof.

In addition, according to the present invention, a computer program corresponding to the control of the CMS of the embodiment described above or a storage medium in which the computer program is stored may be supplied to a computer mounted on a vehicle, and the computer may read and execute the program code stored in the storage medium.

SUMMARY OF EMBODIMENTS

First Aspect

An image display apparatus 10 operable to display an image of surroundings of a self-vehicle V comprises an image capturing unit 11L, 11R, 21 configured to capture what is to a side rear of the self-vehicle V;

a display unit 11L, 11R configured to display an image 40 captured by the image capturing unit 12L, 12R;

a generation unit 16, 16*d* for generating an indicator 47 for indicating a distance from the self-vehicle V to the rear;

a superimposition unit 16, 16d for superimposing the indicator 47 onto an image to be displayed on the display unit 12L, 12R, wherein the display unit 12L, 12R comprises a first display unit 12L that displays an image of what is to the left side rear of the self-vehicle V and a second display unit 12R that displays an image of what is to the right side rear of the self-vehicle V, and the generation unit 16, 16d generates an indicator 47 to be superimposed on an image displayed on the first display unit 12L and/or an indicator 47 to be superimposed on an image displayed on the second display unit 12R, in accordance with an operation of the direction indication operation unit 7 or an operation of a predetermined operation unit 15 provided separately to the direction indication operation unit 7.

By virtue of the first aspect, it is possible to easily know the distance to an object present in the surroundings of the self-vehicle. In particular, since the indicator can be displayed by the predetermined operation unit which is provided separately from the direction indication operation unit 7, convenience when the user desires to confirm the side rear in advance, such as in the case of a lane change, is improved.

Second Aspect

With respect to the first aspect, the predetermined operation unit 15 is provided at an end portion of the direction indication operation unit 7.

By virtue of the second aspect, by providing a predetermined operation unit in the direction indication operation unit, it is possible to display the indicator by the predetermined operation unit and perform a direction indication smoothly after confirming the right and left side rear. In addition, by arranging operation units related to lane change operations close to each other, it is possible to prevent erroneous recognition of an operation.

Third Aspect

With respect to the first or second aspect, the generation unit 16, 16d further comprises an image processing unit 16d for transforming, in accordance with the display area 42, 42a, 42b of the display unit 12L, 12R, an image 40 captured by the image capturing unit 11L, 11R, and the image processing unit 16d cuts out the image 40, at a predetermined angle of view 41, 41a, 41b, in accordance with an operation on the direction indication operation unit 7 or the predetermined operation unit 15, and displays the image on the display unit 12L or 12R.

By virtue of the third aspect, it is possible to confirm a positional relationship with an object present in the surroundings of the self-vehicle by the image and the indicator.

Fourth Aspect

With respect to the third aspect, the display unit 12L, 12R can switch between a first display mode (mirror view mode) in which the image 40 is displayed at a first angle of view 41a and a second display mode (wide-angle view mode) in which the image 40 is displayed at a second angle of view 41b that is wider than the first angle of view, and in the second display mode (wide-angle view mode), a compressed image 41b, which is obtained by cutting out an image 41b corresponding to a region 42b on a side away from the vehicle laterally in a display region 42 of the display unit 12L, 12R and by compressing the image in accordance with the shape of the region 42b on the side away from the vehicle laterally, and an uncompressed image 41a, which is obtained by cutting out the image 41a corresponding to a region 42a on a vehicle side in the display region 42 of the display unit 12L, 12R, are displayed adjacently in the display region 42 of the display unit 12L, 12R, and in the second display mode (the wide-angle view mode), the boundary line 45 is displayed such that it is possible to distinguish between the display region 42b of the compressed image and the display region 42a of the uncompressed image.

By virtue of the fourth aspect, it is possible to confirm a state of an object present outside of the self-vehicle by the indicator and the image, and it is possible to prevent the erroneous recognition of an object present outside of the self-vehicle.

Fifth Aspect

With respect to the fourth aspect, the indicator 47 is displayed in the display region 42a of the uncompressed image, and is not displayed in the display region 42b of the compressed image.

By virtue of the fifth aspect, erroneous recognition of the indicator due to distortion can be avoided.

Sixth Aspect

With respect to the fifth aspect, the indicator 47 is a plurality of guidance lines 47a, 47b, and 47c arranged at predetermined intervals in the longitudinal direction of the vehicle body and extending in the horizontal direction, and an end of the guidance line 47a closest to the self-vehicle V is displayed so as to contact the boundary line 45.

By virtue of the sixth aspect, the indicator can be displayed at a large size and the boundary line can be easily visually recognized.

Seventh Aspect

By virtue of any one of the first to sixth aspects, the direction indication operation unit 7 has a first direction indication mode for indicating during an operation on the direction indication operation unit 7 and a second direction indication mode for indicating for a predetermined time in accordance with a temporary operation on the direction indication operation unit 7, the generation unit 16, 16d superimposes the indicator 47 in the second direction indication mode, and the predetermined time is shorter than the time for displaying the indicator 47 in accordance with the operation of the predetermined operation unit 15.

By virtue of the seventh aspect, since it is considered that the user does not intend to confirm the surrounding situation for an extended period when an operation on the direction indication operation unit to turn on a turn signal for a limited period was performed, the display time of the indicator is shortened as compared with the case where the predetermined operation unit is operated. Since it is considered that the user intends to confirm the surrounding situation for an extended period when the predetermined operation unit is operated, the display time of the indicator is made longer than that when the direction indication operation unit is operated to turn on the turn signal for a limited period of time.

What is claimed is:

1. An image display apparatus operable to display an image of surroundings of a self-vehicle, the apparatus comprising:
    an image capturing unit configured to capture what is to a side rear of the self-vehicle;
    a display unit configured to display an image captured by the image capturing unit;
    a generation unit configured to generate an indicator for indicating a distance from the self-vehicle to the rear; and
    a superimposition unit configured to superimpose the indicator onto an image to be displayed on the display unit, wherein
    the display unit comprises a first display unit that displays an image of what is to the left side rear of the self-vehicle and a second display unit that displays an image of what is to the right side rear of the self-vehicle, and
    the generation unit generates an indicator to be superimposed on an image displayed on the first display unit and/or an indicator to be superimposed on an image displayed on the second display unit, in accordance with an operation of a direction indication operation unit or an operation of a predetermined operation unit provided separately to the direction indication operation unit,
    the generation unit further comprises an image processing unit configured to transform an image captured by the image capturing unit in accordance with a display region of the display unit, and
    the image processing unit cuts out an image, at a predetermined angle of view, in accordance with an operation on the direction indication operation unit or the predetermined operation unit, and displays the image on the display unit,
    the display unit can switch between a first display mode in which the image is displayed at a first angle of view and a second display mode in which the image is displayed at a second angle of view that is wider than the first angle of view, and
    in the second display mode, a compressed image, which is obtained by cutting out an image corresponding to a region on a side away from the vehicle laterally in a display region of the display unit and by compressing the image in accordance with the shape of the region on the side away from the vehicle laterally, and an uncompressed image, which is obtained by cutting out an image corresponding to a region on a vehicle side in the display region of the display unit, are displayed adjacently in the display region of the display unit, and
    in the second display mode, a boundary line is displayed such that it is possible to distinguish between the display region of the compressed image and the display region of the uncompressed image.

2. The image display apparatus according to claim 1, wherein the predetermined operation unit is provided at an end of the direction indication operation unit.

3. The image display apparatus according to claim 1, wherein the indicator is displayed in a display region of the uncompressed image and is not displayed in a display region of the compressed image.

4. The image display apparatus according to claim 3, wherein
    the indicator is a plurality of guidance lines arranged at predetermined intervals in the longitudinal direction of the vehicle body and extending in the horizontal direction, and
    an end of the guidance line closest to the self-vehicle is displayed so as to contact the boundary line.

5. The image display apparatus according to claim 1, wherein
    the direction indication operation unit has a first direction indication mode for indicating a direction during an operation on the direction indication operation unit and a second direction indication mode for indicating a direction for a predetermined time in accordance with a temporary operation on the direction indication operation unit,
    the generation unit superimposes the indicator in the second direction indication mode, and
    the predetermined time is shorter than the time for displaying the indicator in accordance with the operation of the predetermined operation unit.

6. A method for controlling an image display apparatus operable to display an image of surroundings of a self-vehicle,
    the image display apparatus having
    an image capturing unit configured to capture what is to a side rear of the self-vehicle and
    a display unit configured to display an image captured by the image capturing unit,
    the display unit comprising a first display unit that displays an image of what is to the left side rear of the self-vehicle and a second display unit that displays an image of what is to the right side rear of the self-vehicle, wherein the display unit can switch between a first display mode in which the image is displayed at a first angle of view and a second display mode in which the image is displayed at a second angle of view that is wider than the first angle of view, and
    in the second display mode, a compressed image, which is obtained by cutting out an image corresponding to a region on a side away from the vehicle laterally in a display region of the display unit and by compressing the image in accordance with the shape of the region on the side away from the vehicle laterally, and an uncompressed image, which is obtained by cutting out an image corresponding to a region on a vehicle side in the display region of the display unit, are displayed adjacently in the display region of the display unit, and
    in the second display mode, a boundary line is displayed such that it is possible to distinguish between the display region of the compressed image and the display region of the uncompressed image,
    wherein the method comprises:
        generating an indicator for indicating a distance from the self-vehicle to the rear; and
        superimposing the indicator onto an image to be displayed on the display unit, wherein
        in the generating an indicator to be superimposed on an image displayed on the first display unit and/or an indicator to be superimposed on an image displayed on the second display unit is generated, in accordance with an operation of a direction indication operation unit or an operation of a predetermined operation unit provided separately to the direction indication operation unit, and
        the generating further comprises image processing to transform an image captured by the image capturing unit in accordance with a display region of the display unit, and
        the image processing cuts out an image, at a predetermined angle of view, in accordance with an operation on the direction indication operation unit or the predetermined operation unit, and displays the image on the display unit.

7. The method according to claim 6, wherein the predetermined operation unit is provided at an end of the direction indication operation unit.

8. The method according to claim 6, wherein the indicator is displayed in a display region of the uncompressed image and is not displayed in a display region of the compressed image.

9. The method according to claim 8, wherein
the indicator is a plurality of guidance lines arranged at predetermined intervals in the longitudinal direction of the vehicle body and extending in the horizontal direction, and
an end of the guidance line closest to the self-vehicle is displayed so as to contact the boundary line.

10. The method according to claim 6, wherein
the direction indication operation unit has a first direction indication mode for indicating a direction during an operation on the direction indication operation unit and a second direction indication mode for indicating a direction for a predetermined time in accordance with a temporary operation on the direction indication operation unit,
the generating superimposes the indicator in the second direction indication mode, and
the predetermined time is shorter than the time for displaying the indicator in response to the operation of the predetermined operation unit.

11. A non-transitory computer-readable storage medium storing a program for causing a computer to execute a method for controlling an image display apparatus operable to display an image of surroundings of a self-vehicle,
the image display apparatus having
an image capturing unit configured to capture what is to a side rear of the self-vehicle and
a display unit configured to display an image captured by the image capturing unit,
the display unit comprising a first display unit that displays an image of what is to the left side rear of the self-vehicle and a second display unit that displays an image of what is to the right side rear of the self-vehicle, wherein the display unit can switch between a first display mode in which the image is displayed at a first angle of view and a second display mode in which the image is displayed at a second angle of view that is wider than the first angle of view, and
in the second display mode, a compressed image, which is obtained by cutting out an image corresponding to a region on a side away from the vehicle laterally in a display region of the display unit and by compressing the image in accordance with the shape of the region on the side away from the vehicle laterally, and an uncompressed image, which is obtained by cutting out an image corresponding to a region on a vehicle side in the display region of the display unit, are displayed adjacently in the display region of the display unit, and
in the second display mode, a boundary line is displayed such that it is possible to distinguish between the display region of the compressed image and the display region of the uncompressed image,
wherein the method comprises:
generating an indicator for indicating a distance from the self-vehicle to the rear; and
superimposing the indicator onto an image to be displayed on the display unit, wherein
in the generating an indicator to be superimposed on an image displayed on the first display unit and/or an indicator to be superimposed on an image displayed on the second display unit is generated, in accordance with an operation of a direction indication operation unit or an operation of a predetermined operation unit provided separately to the direction indication operation unit, and
the generating further comprises image processing to transform an image captured by the image capturing unit in accordance with a display region of the display unit, and
the image processing cuts out an image, at a predetermined angle of view, in accordance with an operation on the direction indication operation unit or the predetermined operation unit, and displays the image on the display unit.

* * * * *